US008016962B2

(12) United States Patent
Kursawe

(10) Patent No.: US 8,016,962 B2
(45) Date of Patent: Sep. 13, 2011

(54) DEVICES FOR CONVEYING AND LABELLING CONTAINERS AND METHOD FOR CONNECTING A LABELLING UNIT TO A CONVEYOR UNIT

(75) Inventor: Andreas Kursawe, Kirchroth (DE)

(73) Assignee: Krones AG, Neutraubling (DE)

( * ) Notice: Subject to any disclaimer, the term of this patent is extended or adjusted under 35 U.S.C. 154(b) by 263 days.

(21) Appl. No.: 10/533,755

(22) PCT Filed: Dec. 17, 2004

(86) PCT No.: PCT/EP2004/014400

§ 371 (c)(1), (2), (4) Date: May 4, 2005

(87) PCT Pub. No.: WO2005/068301

PCT Pub. Date: Jul. 28, 2005

(65) Prior Publication Data

US 2007/0163697 A1 Jul. 19, 2007

(30) Foreign Application Priority Data

Jan. 19, 2004 (DE) ......................... 10 2004 002 798

(51) Int. Cl.
*B29C 65/00* (2006.01)

(52) U.S. Cl. ... 156/64; 156/378; 156/538; 156/DIG. 24; 156/DIG. 44; 700/117

(58) Field of Classification Search .................. 156/378, 156/DIG. 44, DIG. 45, DIG. 46, 64, 367, 156/368, 538, 567, DIG. 24, DIG. 25
See application file for complete search history.

(56) References Cited

U.S. PATENT DOCUMENTS

| | | | | | |
|---|---|---|---|---|---|
| 5,534,890 | A * | 7/1996 | Krug et al. | ..................... | 346/100 |
| 5,713,403 | A * | 2/1998 | Clusserath et al. | ........... | 141/101 |
| 6,345,294 | B1 * | 2/2002 | O'Toole et al. | ............... | 709/222 |
| 6,619,361 | B1 * | 9/2003 | Swinburne | .................... | 156/539 |
| 2002/0161467 | A1 * | 10/2002 | Hashiguchi et al. | .......... | 700/116 |
| 2004/0024867 | A1 * | 2/2004 | Kjellberg | ...................... | 709/224 |
| 2004/0099379 | A1 * | 5/2004 | Erich | ............................ | 156/567 |

FOREIGN PATENT DOCUMENTS

| | | | |
|---|---|---|---|
| DE | 19741476 A1 | | 3/1999 |
| EP | 1097871 A1 | | 5/2001 |
| EP | 1122173 A2 | * | 8/2001 |
| WO | WO 03/024861 | * | 3/2003 |
| WO | WO 03/024861 A1 | | 3/2003 |

* cited by examiner

*Primary Examiner* — John Goff
(74) *Attorney, Agent, or Firm* — Marshall, Gerstein & Borun LLP

(57) ABSTRACT

A device having a conveyance device for conveying containers, to which at least one labeling unit for containers may be connected, wherein at least identification data of the labeling unit can be transmitted to the conveyance device. In addition, a device having a labeling unit for labeling containers, which can be connected to a conveyance device for conveying the containers, wherein at least identification data of the labeling device can be transmitted to the conveyance device. In addition, a corresponding device having a conveyance device and a labeling unit. Also, a method for connecting a labeling unit for labeling containers, to a conveyance device for conveying the containers, wherein at least identification data is transmitted from the labeling unit to the conveyance device.

11 Claims, 3 Drawing Sheets

DEVICES FOR CONVEYING AND LABELLING CONTAINERS AND METHOD FOR CONNECTING A LABELLING UNIT TO A CONVEYOR UNIT

REFERENCE TO RELATED APPLICATIONS

This is the U.S. national stage, under 35 U.S.C. §371, of international application No. PCT/EP2004/014400, having an international filing date of Dec. 17, 2004, and claims priority to German application no. 102004002798.6, filed Jan. 19, 2004.

FIELD OF THE DISCLOSURE

This disclosure relates to a device having a conveyance device for conveying containers, to which at least one labeling unit for containers may be connected. Moreover this invention relates to a method for connecting a labeling unit for labeling containers to a conveyance device for conveying the containers.

BACKGROUND OF THE DISCLOSURE

WO 03/024861 A1 and DE 197 41 476 A1 describe labeling machines. With these labeling machines, bottles are conveyed on a circular segment path on a carousel. A conveyance device is provided for this purpose. Labeling units may be connected to the outside of the conveyance device.

Several different labeling units are provided here for the various labeling methods, such as labeling with self-stick labels, labeling with hot glue, labeling with cold glue, etc.

In this way it is possible to apply different labels to different types of bottles using one and the same central conveyance device. It is also possible to apply different types of labels to one and the same bottle, e.g., a front label and a neck label or the like.

Due to the modular design of the labeling machines, it is also possible to provide different labeling methods for different products, because by simply replacing a labeling unit, a different type of label may be applied in a different labeling method.

The labeling unit as well as the conveyance device each have their own control equipment for controlling the respective conveyance sequences.

SUMMARY OF THE DISCLOSURE

When the labeling unit is changed, the respective controls are switched to the desired labeling mode.

The object of the present disclosure is to facilitate the replacement of labeling units.

The labeling unit has identification data which identifies the labeling unit. This may be, for example, a so-called electronic nameplate, which includes, for example, the type of machine, the commission number, the software version number or the like.

The conveyance device and the labeling unit are designed so that the identification data on the labeling unit can be transmitted to the conveyance device.

Thus at least a portion of the required configuration of the conveyance device and the labeling unit can be accomplished automatically when the labeling unit is replaced.

In an advantageous embodiment, the conveyance device and the labeling unit are designed so that address information can be transmitted from the conveyance device to the labeling unit. The address information is preferably an IP (Internet Protocol) address. This may also be accomplished before the transfer of the identification data. In principle, in an alternative embodiment it is also possible to enter the address information by hand into the labeling unit. However, automatic transfer is more convenient.

In a preferred embodiment, the conveyance device has a memory for storing multiple items of address information, which can be transferred so that multiple labeling units may also be connected, each of which can be addressed by a separate address.

In another advantageous embodiment, the identification data and the address information is transferred via various transfer devices. For example, the identification data may be transferred via a local network such as an Ethernet, Internet, Internet, etc. whereas the address information may be transferred via a proprietary connection between the labeling unit and the conveyance device. The proprietary connection may use its own special data protocol.

In an advantageous embodiment, the labeling unit also has a memory for adjustable address information. The address information transferred from the conveyance device may be stored here and then subsequently the communication with the conveyance device or other network users can be accomplished via this address.

For example, it is advantageous in particular if the conveyance device can be connectable to the Internet, so that the labeling unit can also be addressed over the Internet. This is advantageous in particular in the case of remote diagnosis and remote configuration or, for example, software updates for the labeling unit, etc.

In the method for connecting a labeling unit to a conveyance device, at least identification data is transmitted from the labeling unit to the conveyance device.

In an advantageous embodiment of the method, before the identification data is transferred, address information is transferred from the conveyance device to the labeling unit. This has the advantage that communication can take place between the conveyance device and the labeling unit with this address information (network address).

In another advantageous embodiment, the identification data and the address information is transferred via different connection devices. This has the advantage that the address information can be transmitted via a relatively simple transmission device so that it is possible to communicate via a high-power connection with this address information.

After transferring the identification data, in a preferred embodiment, any data, instructions, synchronization data, information about the machine state, information about the label supply, glue supply, etc., commands, software, program modules or the like can be transmitted between the conveyance device and the labeling unit and/or in the opposite direction.

BRIEF DESCRIPTION OF THE DRAWINGS

Advantageous embodiments of the devices and the method will now be explained on the basis of the accompanying figures, in which.

DETAILED DESCRIPTION OF THE DISCLOSURE

Figure 1:
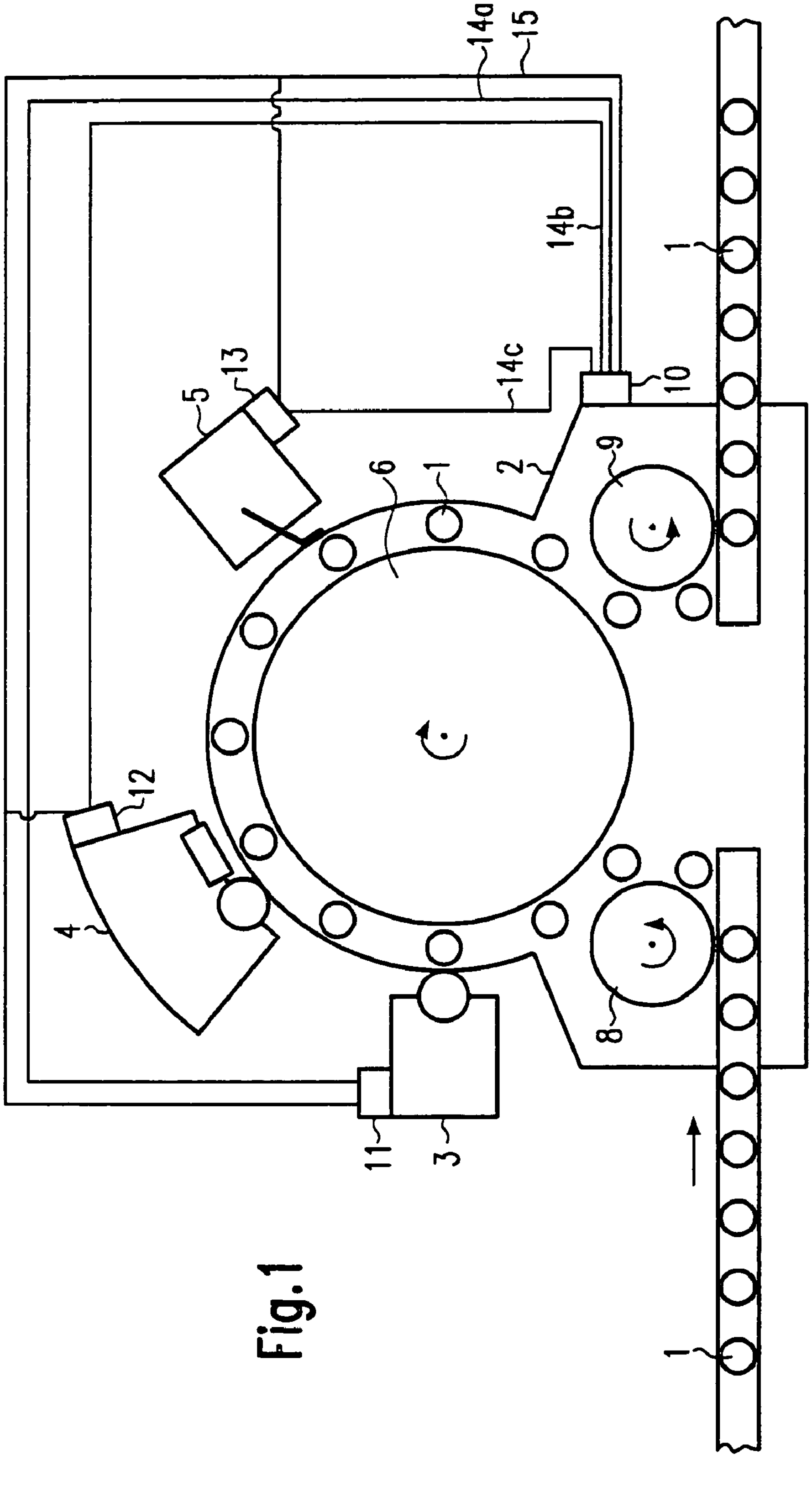
FIG. 1 shows a schematic top view of a labeling machine having a centrally located conveyance device and three labeling units.

FIG. 1 shows a modular labeling machine. The labeling machine includes a central conveyance device 2 with which bottles 1 can be conveyed. The bottles 1 enter from the left and can be transferred via a first star 8 to a carousel 6. The carousel includes container platforms which can be rotated individually with servo controls, so the bottles can be oriented in any desired way.

Three labeling units 3, 4, and 5 are arranged on the outside around the conveyance device 2. These labeling units are indicated only schematically. Reference number 3 indicates schematically a cold glue unit while reference number 4 indicates a hot glue unit and reference number 5 indicates a dispensing unit for self-stick labels.

Since one bottle may have several labels, it may in some cases also be necessary to provide multiple labeling units.

The labeled bottles 1 may be sent via a star 9 to a discharge conveyor so that the bottles can be discharged to the right.

The conveyance device 2 is equipped with a control unit 10, and the labeling units 3, 4, and 5 are each equipped with a control unit 11, 12 and 13, respectively.

Between the control unit 10 and the control units 11, 12 and 13, there is an individual connecting line 14*a*, 14*b*, 14*c* which may consist of a multi-strand cable, for example, which may be provided at one end or the other or even in the middle with a plug/socket.

In addition, the control unit 10 is connected to the other control units 11, 12 and 13 via a network line 15. This may be, for example, a shielded cable for network applications (local networks).

Figure 2:
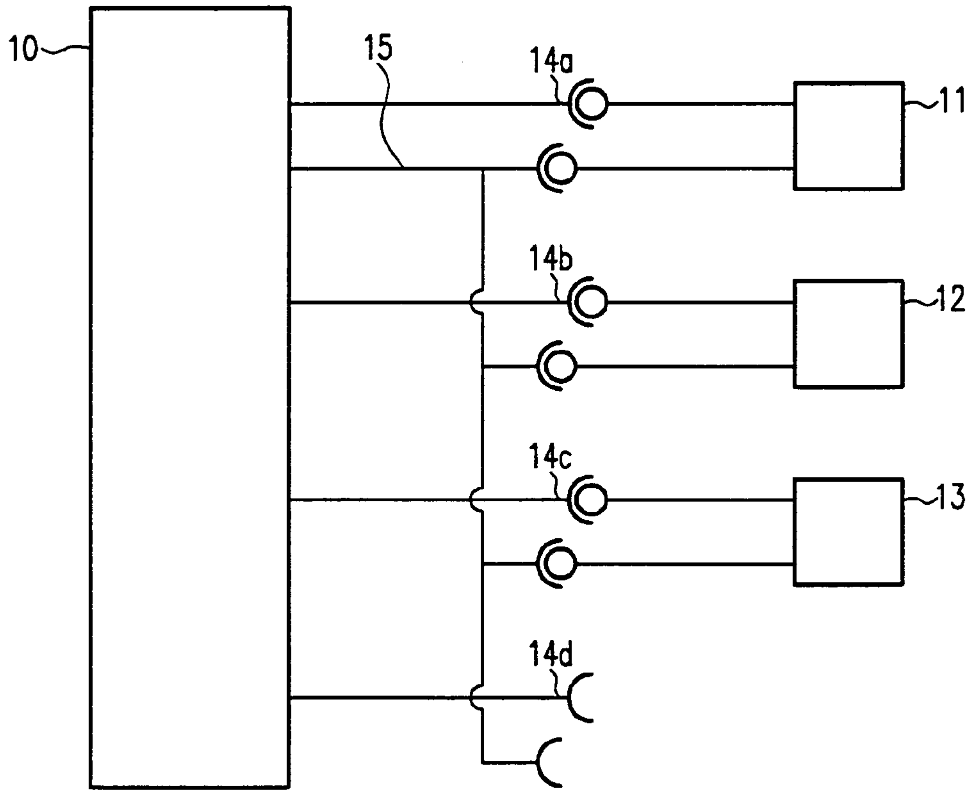
FIG. 2 shows a schematic diagram of the connection between the conveyance device and the labeling units.

FIG. 2 shows schematically the circuit for the various control units. The control unit 10 of the conveyance device is connected to various control units 11, 12 and 13 of labeling units over lines 14*a*, 14*b* and 14*c*. In addition, the control unit 10 is connected by another connecting line 15 to the control units 11,12 and 13. FIG. 2 shows schematically a socket/plug combination for the respective lines to the control units of the labeling units. The sockets/plugs may be assigned either to the control unit 10 or to the control units 11, 12 or 13.

For connecting the labeling units to the control units 11, 12 and 13, multiple plug receptacles for the electric connections are provided on the conveyance device 2. Cables with plugs for the control units 11, 12 and 13 of the labeling units may be inserted into appropriate plug receptacles on the conveyance device.

Thus up to six plug receptacles for up to six labeling units may be provided on the conveyance device. A preset address information may be assigned to each plug receptacle and then issued to the corresponding labeling unit plugged in there.

The plug connections shown separately in FIG. 2 for the lines 14 and 15 may also be combined in a single plug. Each plug/socket combination may have one or more pins. The plug/socket combination for the lines 14*a* through 14*b* is preferably designed for three pins. The line 15 may be a coaxial cable, a twisted pair cable or a similar cable suitable for network applications.

The connections between the control unit and the control units 11, 12 and 13 may also be wireless, i.e., via wireless connection or optical.

The method for connecting the labeling unit 3 to the conveyance device 2 will now be explained with reference to FIGS. 3*a*-3*e*.

Figure 3A:
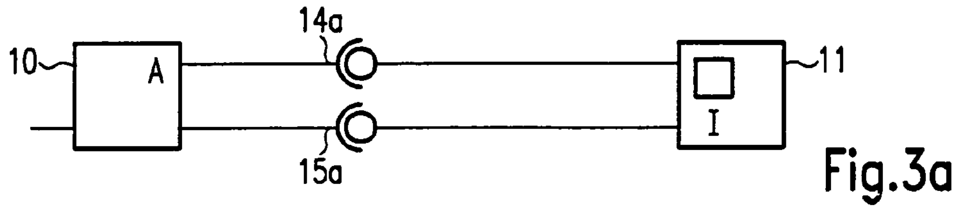
FIGS. 3*a*-3*e* shows various states in the process sequence.

FIG. 3*a* illustrates the state in which a labeling unit 3 has been connected with its connections to the control unit 10 of the conveyance device 2. The control unit 11 has identification information I which is needed by the control unit 10. The control unit 10, however has an address A stored which is to be assigned to the control unit 11 of the labeling unit.

Figure 3B:
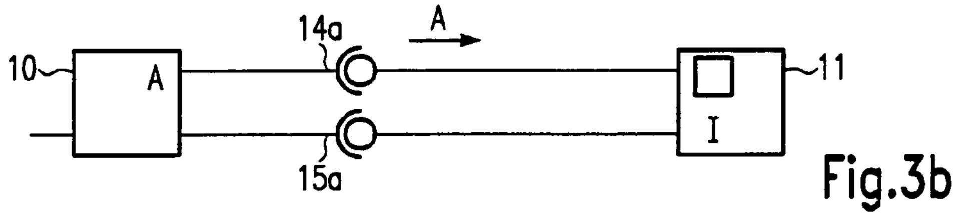

First, the address information A, as shown in FIG. 3*b*, is transmitted from the control unit 10 of the conveyance device to the control unit 11 of the labeling unit over the connecting line 14*a*. This may be accomplished with any data protocol. Only very little information need be transmitted here so that no special requirements need be made regarding the transmission capacity.

Figure 3C:
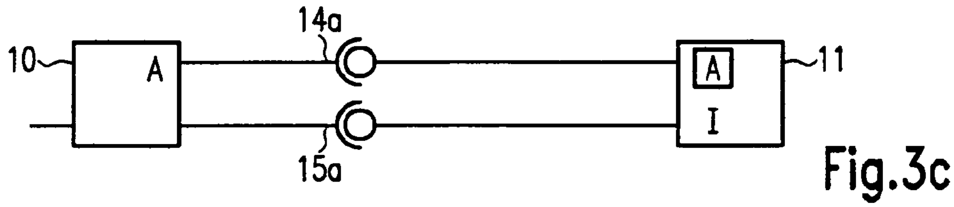

The address A received by the control unit 11 is stored in this unit (see FIG. 3*c*).

The address information is preferably an IP address (Internet protocol). With this help of this address A, communication between the control unit 11 and the control unit 10 as well as any part of a higher-level network (e.g., production line network, company's in-house network, Internet) may take place via the connection 15.

Figure 3D:
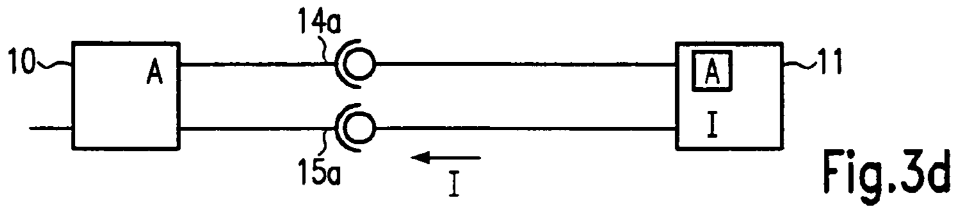
Figure 3E:
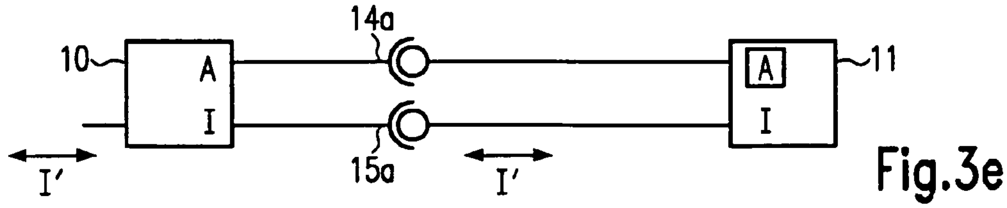

As shown in FIG. 3*d*, the identity information I of the control unit 11 of the labeling unit is transmitted with the help of the stored address information A to the control unit 10 of the conveyance device and may be analyzed there.

After the control unit 10 has received the identity information I, any information I' can be exchanged between the control unit 10 and the control unit 11. Information I' can also be exchanged between the control unit 11 and the remainder of the higher level network as well as the control unit 10 and the remainder of the higher level network (remote diagnosis, remote updates, etc.) (see FIG. 3*e*).

The address information A is transmitted via another connecting line as the identity data I.

The identity data I is usually more extensive than the address information A which consists of only 12 digits (IP address), whereas the identity data I is comprised of much more extensive data.

The control unit 10 of the conveyance device itself has an IP address with which it is possible to communicate accordingly.

The invention claimed is:

1. Device comprising a conveyance device for conveying containers, to which at least one control unit of a corresponding exchangeable labeling unit for containers may be connected via one of multiple plug receptacles that are provided on the conveyance device, each of the plug receptacles having assigned thereto a preset address information stored within a memory of the conveyance device, wherein the address information is an IP-address;

and wherein the address information assigned to a first one of the plug receptacles differs from the address information assigned to a second one of the plug receptacles; and wherein, when a control unit of a labeling unit is connected to any one of the plug receptacles, the preset address information assigned to this plug receptacle can be transmitted to the control unit of the labeling unit; and wherein at least identification data of the labeling unit can be transmitted to the conveyance device, the identification data being identity information of the control unit of the labeling unit, including at least an electronic nameplate of the labeling unit, the electronic nameplate including the type of machine, the commission number or the software version number of the labeling unit, the identification data distinguishing the labeling unit from at least one other labeling unit.

2. Device comprising a conveyance device for conveying containers, and an exchangeable labeling unit having a respective control unit that is connectable to one of multiple plug receptacles of a conveyance device for labeling the containers; and wherein after connecting the control unit of the labeling unit to the conveyance device via the plug receptacle, preset address information assigned to this plug receptacle can be transmitted to the control unit, wherein the address information is an IP-address stored within a memory of the conveyance device, and wherein the address information assigned to a first one of the plug receptacles differs from the address information assigned to a second one of the plug receptacles; and wherein at least identification data of the labeling unit can be transmitted to the conveyance device, the identification data being identity information of the control unit of the labeling unit, including an electronic nameplate of the labeling unit, the electronic nameplate including the type of machine, the commission number or the software version number of the labeling unit, the identification data distinguishing the labeling unit from at least one other labeling unit.

3. Device according to claims 1 or 2, wherein at least two different connecting lines are provided which connect a control unit of the conveyance device and the control unit of a labeling unit, and wherein one connecting line is provided for transmitting address information and the other connecting line is provided at least for transmitting the identification data.

4. Device according to claims 1 or 2, wherein the labeling unit has a memory for adjustable address information.

5. Device according to claims 1 or 2, wherein the conveyance device is connected to an internal computer network.

6. Device according to claims 1 or 2, wherein the conveyance device has an Internet connection.

7. Device according to claims 1 or 2, wherein any one of any type of data, instructions, synchronization data, information about a machine state, information about a label supply, a glue supply, commands, software, program modules, and any combination thereof can be transmitted in either direction between the conveyance device and the labeling unit.

8. Method for connecting an exchangeable labeling unit for labeling containers to a conveyance device for conveying the containers, comprising connecting a control unit of the labeling unit to the conveyance device via one of multiple plug receptacles provided on the conveyance device, wherein each of the plug receptacles has assigned thereto a preset address information stored within a memory of the conveyance device, and wherein the address information is an IP-address, and wherein the address information assigned to a first one of the plug receptacles differs from the address information assigned to a second one of the plug receptacles; and transmitting from the conveyance device to the control unit of the labeling unit the preset address information assigned to the plug receptacle via which the control unit of the labeling unit is connected to the conveyance device; and thereafter transmitting at least identification data from the control unit of the labeling unit to the conveyance device, the identification data being identity information of the control unit of the labeling unit, including an electronic nameplate of the labeling unit, the electronic nameplate including the type of machine, the commission number or the software version number of the labeling unit, the identification data distinguishing the labeling unit from at least one other labeling unit.

9. Method according to claim 8, wherein transmitting the identification data and the address information are carried out over various connections.

10. Method according to claims 8 or 9, wherein after transmitting the identification data, transmitting any one of any type of data, instructions, synchronization data, information about a machine state, information about a label supply, a glue supply, commands, software, program modules, and any combination thereof in either direction between the conveyance device and the labeling unit.

11. Device according to claim 3, wherein the one connecting line is provided exclusively for the address information.

* * * * *